ERROR CORRECTING REDUNDANT LOGIC CIRCUITRY

Filed May 24, 1963

2 Sheets-Sheet 1

INVENTOR
GREGORY CONSTANTINE, JR.

BY Daniel M. Koffsky

ATTORNEY

United States Patent Office 3,305,830
Patented Feb. 21, 1967

3,305,830

ERROR CORRECTING REDUNDANT LOGIC CIRCUITRY

Gregory Constantine, Jr., Poughkeepsie, N.Y., assignor to International Business Machines Corporation, New York, N.Y., a corporation of New York Filed May 24, 1963, Ser. No. 283,067
8 Claims. (Cl. 340—146.1)

This invention relates to redundant logic circuitry and more particularly to redundant logic circuits having error correction capabilities.

Redundant techniques are well known for their ability to provide error detection and correction capabilities. However, until lately, a major defect has existed in most of these systems. Specifically, in determining whether system operations were proceeding correctly, it was necessary to have the redundant channels converge at a single point where the validity decision was to be made. To illustrate, if a triple-redundant logic scheme was being exercised and the correctness of the answer was to be determined, the outputs from each of the three logic chains were fed to a "voting" circuit. This circuit produced an output if at least two of its inputs were identical, the probabilities being high that the correct answer was indicated by the two identical inputs. The defect in the system was that if the voting circuit failed, the complete system became immobilized. Thus, this point of convergency was the system's weak link.

Considering present requirements for highly reliable data processing systems, such "weak links" are not only undesirable but substantially defeat the purpose of the redundancy.

Of the more promising attempts at solving the system convergency problem, is the "quadded" logic scheme of J. G. Tryon which is described at pp. 205–228 in "Redundancy Techniques for Computing Systems" by W. C. Mann and R. H. Wilcox, published by Spartan Books (1962). Tryon copes with the error detection and correction problem, not by including voting circuits or points of convergency, but by quadruplicating AND and OR logical circuits and interconnecting them in such a manner that any error which is generated will be automatically corrected in two levels of logic. The system requires two levels of logic to correct a single error because conventional AND and OR circuits are each capable of recognizing only one type of error. For instance, if a three input AND circuit is supposed to have three 0's at its input, but for some reason only two out of three inputs are 0, the AND circuit corrects the error by not producing an output. However, if all three inputs to the AND circuit should be 1, but one is 0, the output from the AND circuit is still in error. On the other hand, if for a particular logical condition all inputs to an OR circuit should be 1, it will correct an error resulting from the transition of one on its inputs from the 1 state to the 0 state. It will not correct the transition of one of its inputs from 0 to 1 if the required logical condition is all 0's on its inputs. Thus it can be seen that with the ordinary AND and OR logical connectives error detection capability is limited to one type of error detection per logic level. Additionally, it should be noted that if disabling malfunctions occur in this type of redundant circuitry, that rather complex switching circuits are needed to provide error isolation capabilities.

Accordingly, it is an object of this invention to provide redundant logical networks having improved error correcting capabilities.

It is another object of this invention to provide an improved redundant logical system wherein no points of convergency are necessitated.

It is another object of this invention to provide an improved redundant error correcting logical system which uses less redundant equipment for a given error correcting ability than heretofore.

It is a further object of this invention to provide a redundant logical system wherein either 0 to 1 or 1 to 0 errors may be detected and corrected in a single level of logic.

Still another object of this invention is to provide a redundant logical network which utilizes a single logical connective circuit.

A still further object of this invention is to provide a redundant logical network wherein malfunctions can be located with relative ease.

In accordance with the above stated objects, it has been discovered that through the use of threshold logic rather than AND–OR logic substantially increased error correcting capabilities are attained with lessened equipment requirements. The circuit configuration for single error correction capability per level of logic requires that a triple redundant threshold logic system be utilized with the thresholds of the particular logic elements being preset in accordance with their desired logical functions.

The foregoing and other objects, features and advantages of the invention will be apparent from the following more particular description of the preferred embodiments of the invention, as illustrated in the accompanying drawings.

Figure 1:
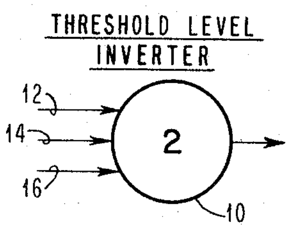
FIG. 1 is a block view of an error correcting threshold circuit which performs a data transmission function.

There are two common types of errors which occur and must be corrected in digital data, i.e., the gain or loss of 1 bits. These errors may be termed "transitional" since the gain of a 1 bit represents a bit transition from 0 to 1 and the loss of a 1 bit, a transition from 1 to 0. For simplicity's sake 1 to 0 erroneous transitions will be termed $e_0$ and 0 to 1 erroneous transitions will be termed $e_1$.

When determining how to cope with these types of errors, a study of basic information theory shows that the best method of coding a single bit to assure its error free transmission is to repeat it an appropriate ($n$) number of times. Additionally, the best means for decoding such a redundant code is to count ($c$) the number of 1's received and if the count exceeds a predetermined number, it can then safely be decided that the received information is a true 1. It is thus obvious that there must be a predetermined relationship between the number of redundant 1 bits and the count.

More specifically, if it is assumed that $n$ redundant 1 bits representing a single bit of information are simultaneously transmitted over a bundle of $n$ lines, and that there may be $e_0$(1 to 0) transitions during the transmission of this information, then as few as $n-e_0$ 1's may arrive at the decoder. But, for the decoder to still produce a 1 output, the received number of 1's must be at least as great as or greater than its count $c$ (remembering the above assumption that the count either be equalled or exceeded for the decoder to produce an error free output). Mathematically, this situation can be described as follows:

$$n-e_0 \geq c \quad (1)$$

or $$n \geq c+e_0 \quad (2)$$

Equation 2 simply states that the number of transmitted 1 bits must be at least equal to the decoder count summed with the number of $e_0$ transitions. Now, considering the transmission of $n$ redundant 0 bits, it can be readily appreciated that the $e_1$ transitions (0 to 1) must be less than the count of the decoder, for the decoder to produce an output indicative of a valid 0 bit. Mathematically, this is expressed as $$c > e_1 \quad (3)$$

Since count $c$ must always be greater than the number of $e_1$ transitions by an integer, Equation 3 can be written as $$c \geq e_1+1 \quad (4)$$

Now, considering the general situation where $e_1$ and $e_0$ errors can occur at random, Equation 2 can be written as $$n \geq e_0+c \geq e_0+e_1+1 \quad (5)$$

For the purposes of minimization, Equation 5 can be written as $$n=e_0+e_1+1 \quad (6)$$

Since for practical purposes, $e_0$ and $e_1$ errors may often be considered as occurring with equal frequency, it can be said that $e_0=e_1$. In this case, Equation 6 becomes $$n=2e+1 \quad (7)$$

Stated in literal terms, Equation 7 says that for $e$ errors to be accommodated in a decoder, sufficient redundant bits must be supplied to equal at least twice the number of errors plus one. Of interest is the special case where it is desired to correct a single error per level of logic. In this case, the number of required redundant bits is three or (2(1)+1). Having decided upon the number of errors which it is desired to accommodate at any level of logic, and then determining the number of redundant bits needed to accomplish this function (through the use of Equation 7), Equations 1 and 4 may then be examined to determine the required count of the decoder.

To implement the above discussion, a well known logical element is available for use as the decoding element, that is, the threshold circuit. Since threshold circuits are well known in the art, no detailed explanation will be given thereof, but it should suffice that they generally may be considered as devices which produce an output upon the simultaneous appearance of a set number of inputs, the number of inputs to produce this condition being predetermined and termed the "threshold." A number of examples of threshold circuits can be found in the article "Linear Input Logic" by R. C. Minnick, at pages 6–16 in the IRE Transactions on Electronic Computers, vol. EC–10, March 1961. Threshold circuits utilizing magnetic cores, transistors, parametrons, tunnel diodes and relay circuits are shown and described therein.

Referring now to FIG. 1, there is shown an error correcting version of a logical circuit 10 which performs a simple data transmission function, i.e., voltage level inversion. If level inverter 10 is to operate in an error free mode and be able to accommodate at least one input transitional error, Equation 7 requires that it have at least three redundant inputs 12, 14 and 16. From examination, it can be determined that for the data transmission function, it is the number of 0 to 1 transitions which determines the count or threshold to which level inverter 10 must be set to provide the desired output. This is expressed by Equation 4 which states that the count must be one greater than the number of $e_1$ transitions. Thus, in this case, where a single input error is to be accommodated, the threshold of the level inverter 10 is set at 2. This threshold is indicated by the numeral 2 within the threshold inverter 10.

That circuit 10 will now operate in an error free mode even when a single input is in error, will be seen from the following examples. If a 1 bit is supposed to appear on redundant inputs 12, 14 and 16, but for some reason only inputs 14 and 16 have 1 bits, threshold level inverter 10 still provides a correct output. This is due to the fact that the two 1 bits equal the threshold of the inverter 10 and cause it to produce an inverted "1" output. Now, if a 0 bit is supposed to be on redundant input lines 12, 14 and 16, but exists on only input lines 12 and 14, line 16 for some reason having a 1 bit, level inverter 10 still produces the correct output since its threshold has not been equalled.

Figure 2:
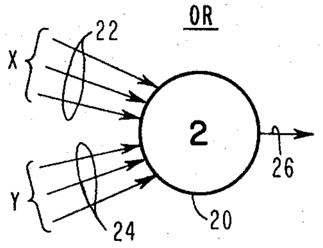
FIG. 2 is a block view of an error correcting threshold circuit which performs a logical OR function.

In FIG. 2 there is shown an error correcting threshold circuit 20 which provides a logical OR connective for a pair of input variables appearing on redundant input lines 22 and 24. In this particular example, and in all succeeding examples, it will be assumed that only a single error is to be accommodated at any level of logic. In this case, Equation 7 requires that each input variable be manifested on at least three redundant lines. Thus, for threshold circuit 20, digital manifestations of variable X (assuming no errors) should identically appear on all of lines 22 and digial manifestations of variable Y should appear on all lines 24. To determine the necessary count required by threshold circuit 20 to produce the required logical output, the "worst case" inputs must be examined to determine the necessary threshold. The worst case (or lowest threshold) is when variables X and Y have complementary values, e.g., 1 and 0. To provide the perfect OR function in this case, threshold circuit 20 would normally have a threshold level of 3 so that upon the appearance, for instance, of all 0's on lines 22 and all 1's on lines 24, it would respond to produce a 1 output on line 26. However, this threshold circuit must be able to ignore a single $e_0$ error. Therefore, in accordance with Equation 1, its threshold is set at 2 so that only two 1 inputs are required before it produces a 1 output on line 26.

Figure 3:
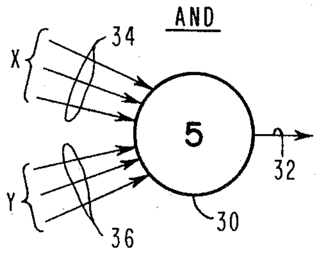
FIG. 3 is a block view of an error correcting threshold circuit which performs a logical AND function.

In FIG. 3 an error correcting threshold circuit 30 is shown which provides the logical AND function. Threshold circuit 30 must produce an output on line 32 when redundant X inputs 34 and Y inputs 36 both manifest 1 inputs. If this were to be a non-error correcting circuit, the threshold would logically be set at 6 so that six 1's would be required on lines 34 and 36 before threshold circuit 30 would produce an output. However, since a single error is to be accommodated (in this case—a single $e_0$ error) the count or threshold of the circuit must be set so that it ignores the error. Thus, in accordance with Equation 1, the threshold is set at ($6-e_0$) or 5. Threshold circuit 30, therefore, produces an output indicative of the AND function when only five 1's exist on lines 36 and 34.

It is well known that most errors which occur in data processing systems, result from malfunctions in the logical elements rather than disturbances in the interconnecting data transmission paths. In this redundant system, the error correcting logic assumes that the errors are generated independently. Realizing this, the data on individual input lines to the threshold circuits of FIGS. 1–3 must be generated independently. This, therefore, requires that in a preceding level of logic, there be the same number of logical circuits as there are redundant inputs in a succeeding level. In other words, if there are six inputs to a threshold circuit, in the preceding level of logic there must be at least six threshold circuits adapted to provide redundant logical operators. By then taking the output from each redundant logical circuit and feeding it in the succeeding level of logic to each redundant logic circuit, the situation occurs where all inputs to each succeeding logic block contain the desired, independently generated, redundant logical operators.

In summary, rules may now be generated which govern the conversion of a nonredundant logical network to a redundant logical network as envisaged by this invention.

Specifically (1) Each interconnection wire between nonredundant logic blocks must be replaced with a bundle of $(2e+1)$ wires, or in the case of single error correction capability, three wires.

(2) Each AND circuit having $y$ inputs must be replaced by $(2e+1)$ threshold elements, each of the threshold elements having $y(2e+1)$ possible inputs and a threshold of $y(2e+1)-e$. In the particular case under consideration (single error correction), each AND circuit is replaced with three threshold elements, each threshold element having six inputs and a threshold of 5. Additionally, each wire of each input bundle is connected to a separate input of each of the threshold elements.

(3) Each $y$ input OR circuit must be replaced by $(2e+1)$ threshold elements, each element having $y(2e+1)$ inputs and having a threshold of $e+1$. Connect as stated in rule 2. In the particular case under consideration, each OR circuit would be replaced with three threshold elements each having six inputs and a threshold of 2.

In each of rules 1–3 above, it has been assumed that $e_0=e_1$, but if this is not the case, then the expression $(e_0+e_1+1)$ must be substituted wherever $(2e+1)$ appears.

Figure 4:
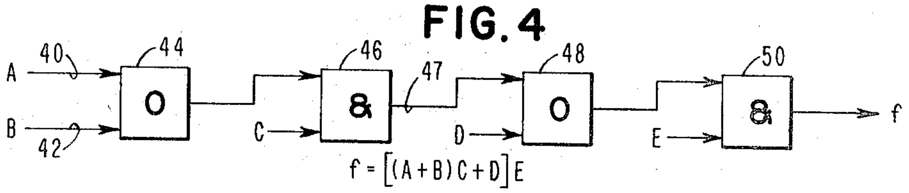
FIG. 4 is a simple AND–OR logic chain.
Figure 5:
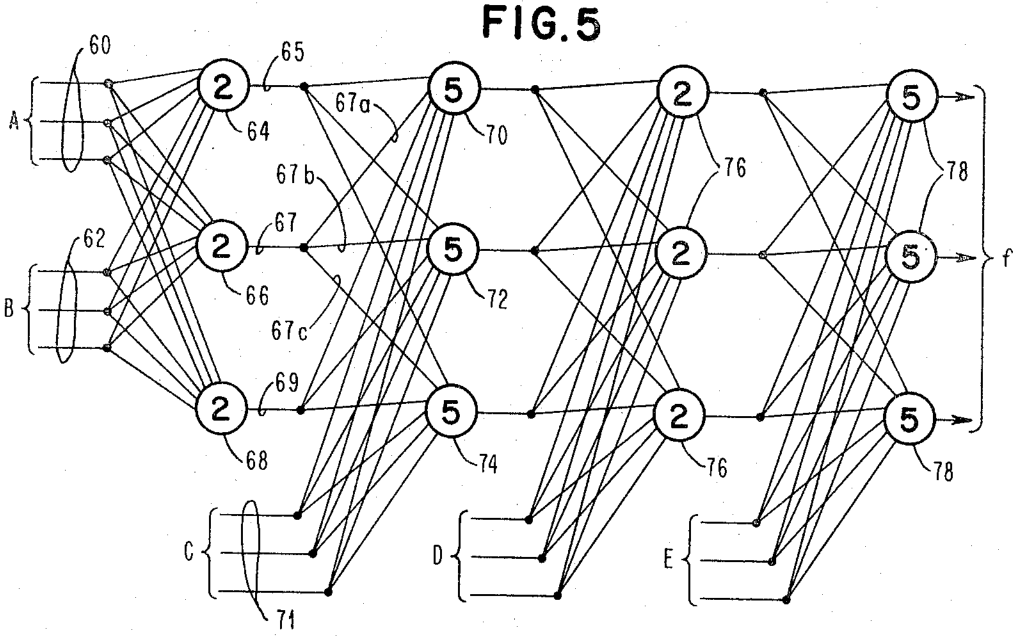
FIG. 5 is an implementation of the logic chain of FIG. 4 in an error correcting logic scheme in accordance with this invention.

In order to illustrate applications of the above rules, attention is drawn to FIG. 4 where a simple logical configuration implementing the function $f=((A+B)C+D)E$ is shown. In FIG. 5, the same logical function is performed, but through the use of redundant, error correcting, threshold logic. To make the transition from the nonredundant, non-error correcting logic shown in FIG. 4 to the redundant, error correcting threshold logic of FIG. 5 involves the application of the rules stated above. Specifically, A and B operand input lines 40 and 42 are replaced in FIG. 5 by input bundles 60 and 62. OR circuit 44 is replaced by threshold elements 64, 66 and 68, each of these elements having a threshold of 2. Each input line in bundles 60 and 62 is connected to each of threshold elements 64, 66 and 68 in accordance with rule 2 stated above. The remaining elements of the redundant error correcting circuit are derived substantially in accordance with the manner just described for OR circuit 44. For instance, AND circuit 46 in FIG. 4 is replaced by threshold elements 70, 72 and 74 each having a threshold of 5. OR circuit 48 and AND circuit 50 are in turn replaced by threshold circuits 76 and 78 respectively and the interconnections between these circuits are made according to the respective rules.

In logical operation the circuit of FIG. 5 is identical to that of FIG. 4 with the exception that the error correcting circuit can withstand a single error per level of logic and still provide a correct output. That the circuit of FIG. 5 operates in an error correcting mode will become apparent from the following specific examples. Assume that operands A and B are respectively 0 and 1 and operand C is 1. If such operands are applied to the circuit of FIG. 4, it can readily be determined that the output from AND circuit 46 on line 47 should be 1, provided the logic circuit is functioning correctly. Likewise in the redundant error correcting circuit of FIG. 5, an identical result should appear on the output lines from threshold circuits 70, 72 and 74, even in the presence of a single error in the equipment With operands A and B on lines 60 and 62 respectively, each of threshold circuits 64, 66 and 68 have applied thereto, three 1 bits and three 0 bits. Since each of the threshold circuits has a level of 2, the three 1 bit inputs are sufficient to cause 1 bit outputs on lines 65, 67 and 69. However, assume that threshold circuit 66 malfunctions and produces a 0 bit instead of the required 1 bit. In this case, an erroneous 0 output is applied via lines *67a*, *67b* and *67c* to threshold elements 70, 72 and 74 respectively. With the 1 bit manifestation on C operand input lines 71, each of threshold elements 70, 72 and 74 have applied thereto five 1 bits and one 0 bit. Since all that is required for these threshold circuits to provide outputs is five 1 bits, the outputs from these respective circuits are each 1—which is the desired and correct output in accordance with the logical function being performed. Thus, it is seen that not only is the error corrected, but also, it is propagated no more than a single stage of logic and thereby does not disturb succeeding levels of logic. In an ordinary redundant operation, such an error would be propagated until a convergent point in the system were reached where a decision would be made concerning the answer's validity or invalidity.

Assume now that a succeeding error takes place in AND circuit 70. Instead of providing the desired 1 bit output, it provides a 0 bit. Further assume that the D operand is 0. In this case, the outputs from threshold circuits 72 and 74 are applied to threshold circuits 76, and even though the output from threshold circuit 70 is erroneous, they provide the correct 1 bit outputs.

Figure 6:
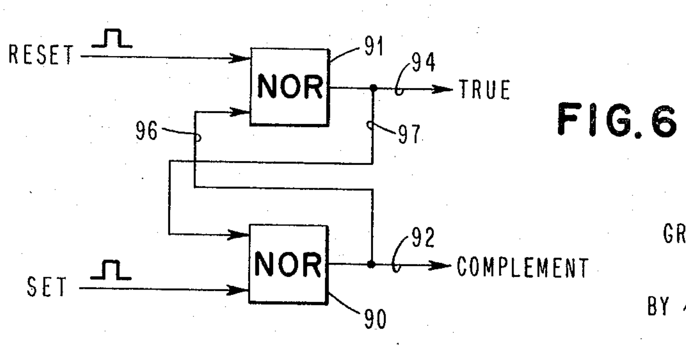
FIG. 6 is a simple NOR latch block diagram.

With reference now to FIG. 6, there is shown a NOR latch which can also be implemented into error correcting redundant logic. As is well known, a NOR logic block provides an output signal only when there are no signals on its inputs. Briefly, the operation of the latch of FIG. 6 is commenced when a Set input is applied to NOR block 90. Previous to this time, complement output line 92 and the true output line 94 are respectively positive and negative. When the Set input is applied to NOR block 90, complement output line 92 switches from a positive voltage level to a negative voltage level causing the level on line 96 to fall. Since the reset input to NOR block 91 is normally at a negative level, NOR block 91 produces a positive level on true output line 94 and causes this voltage to be fed through conductor 97 as an input to NOR block 90. Once the Set pulse disappears, the output of NOR block 90 still remains low due to the latching effect of the aforementioned feedback through conductor 97. The resetting operation for the latch is substantially identical to the Set operation and will not be described.

It may be determined from inspection that rule 2 quoted above, merely requires a minor change to allow a NOR block to be implemented into redundant threshold logic. Specifically, rule 2 holds for the NOR circuit except for the fact that an inverted output is required. This feature is readily obtainable in practice since many circuit configurations of threshold elements have the inherent capability of producing inverted outputs. For instance, when a Kirchoff adder is fed into a transistor circuit, the complement output is available from the collector.

Figure 7:
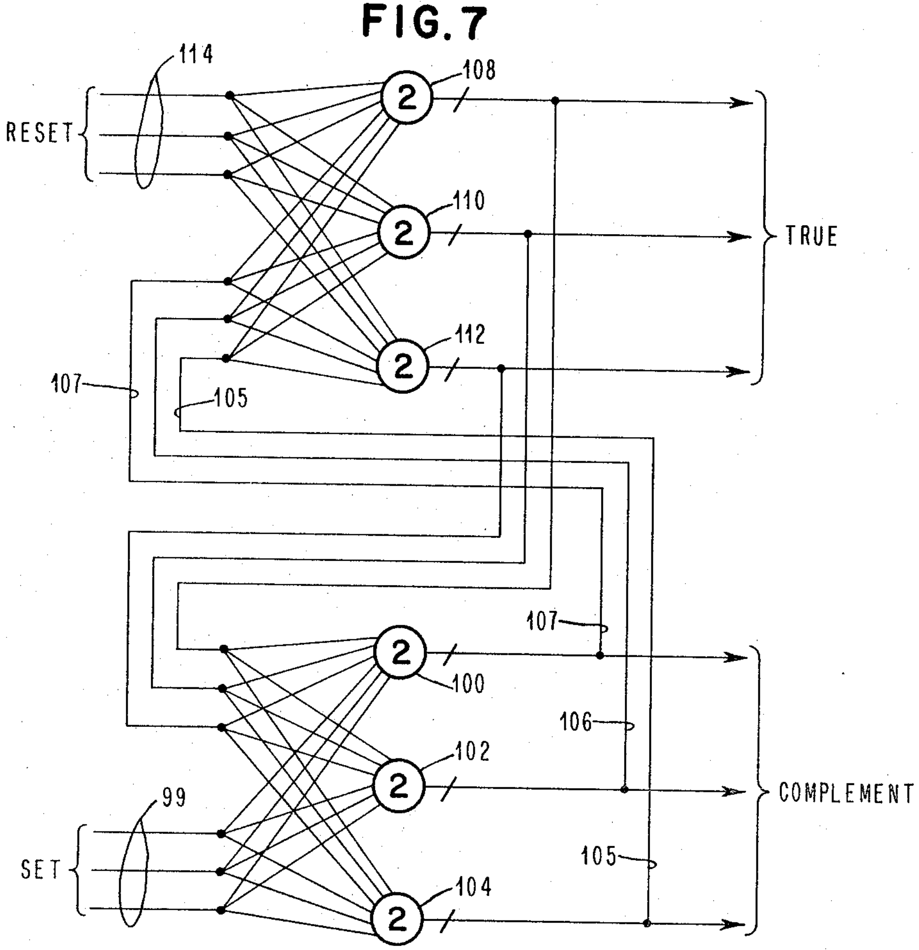
FIG. 7 is an implementation of the latch of FIG. 6 in error correcting logic in accordance with this invention.

In FIG. 7 there is shown a redundant, threshold error correcting implementation of the NOR latch of FIG. 6.

The slash shown on the outputs from each of the threshold elements indicates an inverted output. Since the overall logical operation of the redundant error correcting latch is identical to that shown in FIG. 6, the description of the operation will not be repeated; however, several representative error correcting operations will be discussed.

If redundant 1 bit Set inputs are received on lines 99, the outputs from threshold circuits 100, 102 and 104 are caused to fall. If it is assumed that threshold circuit 102 malfunctions and its output does not fall, then the potential on conductor 106 remains high with resultant erroneous 1 inputs to threshold circuits 108, 110 and 112. Due, however, to the fact that Reset line 114 is low and lines 105 and 107 from threshold circuits 100 and 104 are also low, the thresholds of threshold circuits 108, 110 and 112 are not exceeded and they provide correct outputs, i.e., high.

While no representative circuits are shown, NAND circuits can also be converted from nonredundant logic to redundant threshold error correction logic by utilization of the same reasoning and rules as applied to the AND circuits. As stated with respect to the NOR blocks, the requirement for an inverted output is easily met since substantially all threshold circuits have such an output readily available.

Figure 8:
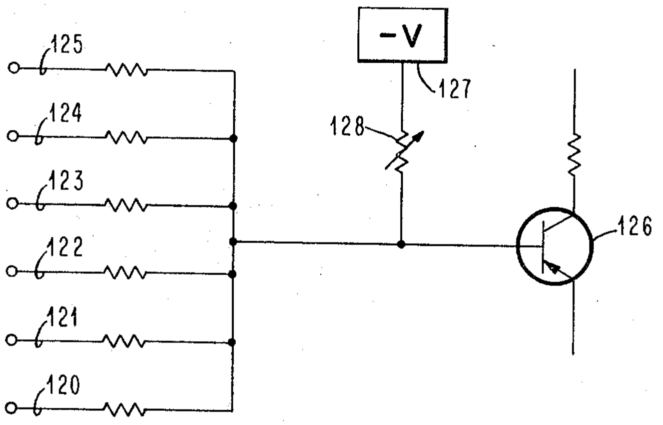
FIG. 8 is a threshold circuit suitable for use in accordance with this invention.

A major problem in prior redundant logic systems has been the difficulty experienced when malfunctions had to be located. Complex switching schemes were necessitated to reduce the redundant logic schemes to nonredundant logic chains which could then be checked with well known malfunction isolation techniques. With redundant logic networks of the types described in FIG. 5, such malfunction isolation is extremely simple. It is accomplished by merely raising the threshold of each of the circuits by a factor of one. When this is accomplished, the system loses all its error correcting capabilities and becomes merely a simple redundant logic chain which can be checked in any one of many ways, e.g., diagnostic programs, etc. FIG. 8 shows a representative threshold circuit with a threshold which is variable in accordance with the potential applied to the base of transistor 126. Basically this circuit is a Kirchoff adder with six inputs 120–125. All of these inputs are connected in parallel to the base of NPN transistor 126. Also connected to the base of transistor 126 through variable resistor 128 is voltage supply 127. Assuming that the circuit of FIG. 8 is being utilized as an error correcting AND circuit, its threshold would be set at 5. That is, five out of six inputs, e.g., 129–133, would have to be energized before transistor 126 would be biased for conduction. When trouble shooting such a circuit, all that is required is that variable resistor 128 be adjusted so that a more negative potential is applied to the base of transistor 126. Then all six positive inputs are required to be energized before transistor 126 begins conduction. Needless to say, this is just one of the many ways in which the threshold level of circuit may be varied and is not to be thought of as limiting the invention as described herein.

While the invention has been particularly shown and described with reference to a preferred embodiment thereof, it will be understood by those skilled in the art that the foregoing and other changes in form and details may be made therein without departing from the spirit and scope of the invention.

I claim:

1. A logical circuit including:
means for generating multiple representations of each of a plurality of operands; and
threshold devices, each threshold device having a threshold which differs from a true logical function by the number of expected errors per level of logic, each acting on multiple representations of each operand and providing outputs according to the presence of a predetermined number of said representations.

2. A logical circuit including:
means for independently generating representations of each of a plurality of operands; and
identical threshold devices, equal in number to the number of independently generated representations of an operand, said threshold devices having a predetermined threshold which differs from a true logical function threshold by the number of expected errors per level of logic, said devices acting on the multiple representations of each operand, and providing outputs according to the presence of predetermined numbers of representations.

3. In a network capable of correctly performing a logical function upon at least $y$ operands in the presence of $e$ erroneous inputs, the combination comprising:
$y(2e+1)$ inputs each $2e+1$ inputs representative of an operand;
at least $2e+1$ threshold elements adapted to perform identical logical functions upon said operands, the threshold of each said element being set at a level $e$ different from that required for the performance of a true logical function; and
means connecting each said input with each said threshold element.

4. The invention as described in claim 3 wherein said threshold elements are adapted to perform an AND logical function, each said threshold element providing an output signal upon the receipt of $y(2e+1)-e$ input signals.

5. The invention as described in claim 3 wherein said threshold elements are adapted to perform an OR logical function, each said threshold element providing an output signal upon the receipt of $e+1$ inputs.

6. The invention as described in claim 3 wherein said threshold elements are adapted to perform a NOR logical function, each said threshold element providing an inverted output signal upon the receipt of $e+1$ inputs.

7. In a redundant logic system wherein $e$ errors may occur in any logic level to be corrected at the next succeeding logic level, the system including a plurality of levels of redundant threshold logic which have been substituted for corresponding nonredundant levels of logic, said redundant logic levels comprising:
$(2e+1)$ AND threshold elements substitued for each $y$ input nonredundant AND logical element, each said AND threshold element requiring at least $y(2e+1)-e$ input signals to produce an output signal;
$(2e+1)$ OR threshold elements substituted for each $y$ input nonredundant OR logical element, each said OR threshold element requiring at least $e+1$ inputs to produce an output signal; and
means for connecting the output from each said threshold element to each threshold element in a succeeding level logic.

8. In a redundant logic system wherein $e$ errors may occur in any logic level to be corrected at the next succeeding logic level, the system including a plurality of levels of redundant threshold logic which have been substituted for corresponding nonredundant levels of logic, said redundant logic levels comprising:
$(e_0+e_1+1)$ AND threshold elements substituted for each $y$ input nonredundant AND logical element, each said AND threshold element requiring at least $y(e_0+e_1+1)-e_0$ input signals to produce an output signal;
$(e_0+e_1+1)$ OR threshold elements substituted for each $y$ input nonredundant OR logical element, each said OR threshold element requiring at least $e_1+1$ inputs to produce an output signal; and
means for connecting the output from each said threshold element to each threshold element in a succeeding level of logic.

(References on following page)

References Cited by the Examiner

UNITED STATES PATENTS

| | | | |
|---|---|---|---|
| 2,942,193 | 6/1960 | Tryon | 340—146.1 X |
| 3,016,517 | 1/1962 | Saltzberg | 340—146.1 X |

OTHER REFERENCES

R. Teoste: "Design of a Repairable Computer," IRE Transactions on Electronic Computers, vol. EC–11, pages 643–649, October 1962, No. 5.

J. Von Neumann: "Probabilistic Logics and the Synthesis of Reliable Organisms From Unreliable Components," in Annals of Mathematics Studies, pages 43–98, 1956, Princeton University Press, Princeton, N.J., No. 34.

W. G. Brown, J. Tierney, and R. Wasserman: "Improvement of Electronic-Computer Reliability Through the Use of Redundancy," IRE Transactions on Electronic Computers, vol. EC–10, No. 3, pages 407–416, September 1961.

MALCOLM A. MORRISON, *Primary Examiner.*

M. P. ALLEN, M. J. SPIVAK, *Assistant Examiners.*